United States Patent [19]
Scheps

[11] Patent Number: 6,137,609
[45] Date of Patent: Oct. 24, 2000

[54] OVER-THE-HORIZON OPTICAL COMMUNICATIONS TRANSCEIVER

[75] Inventor: Richard Scheps, Del Mar, Calif.

[73] Assignee: The United States of America as represented by the Secretary of the Navy, Washington, D.C.

[21] Appl. No.: 08/865,418

[22] Filed: Mar. 27, 1997

[51] Int. Cl.[7] .................................................. H04B 10/00
[52] U.S. Cl. ........................ 359/152; 359/159; 359/172
[58] Field of Search ..................................... 359/159, 169, 359/170, 172

[56] References Cited

U.S. PATENT DOCUMENTS

| | | |
|---|---|---|
| 4,361,911 | 11/1982 | Buser et al. . |
| 4,373,782 | 2/1983 | Thelen . |
| 4,493,114 | 1/1985 | Geller et al. . |
| 4,677,398 | 6/1987 | Honeycutt et al. . |
| 4,777,660 | 10/1988 | Gould et al. ............................ 455/605 |
| 4,829,597 | 5/1989 | Gelbwachs . |
| 4,840,448 | 6/1989 | Thiennot . |
| 4,995,101 | 2/1991 | Titterton et al. ......................... 455/607 |
| 5,038,406 | 8/1991 | Titterton et al. . |
| 5,181,135 | 1/1993 | Keeler . |
| 5,267,070 | 11/1993 | Stewart et al. . |
| 5,301,051 | 4/1994 | Geller . |
| 5,317,442 | 5/1994 | Sharp et al. . |
| 5,333,142 | 7/1994 | Scheps ..................................... 372/22 |
| 5,339,182 | 8/1994 | Kimble et al. . |
| 5,400,164 | 3/1995 | Kurtzke et al. . |
| 5,657,153 | 8/1997 | Endriz et al. ............................ 359/341 |
| 5,745,437 | 4/1998 | Wachter et al. ......................... 367/100 |
| 5,909,296 | 6/1999 | Tsacoyeanes ............................ 359/152 |
| 5,910,851 | 6/1999 | Flaherty ................................. 359/110 |

*Primary Examiner*—Jason Chan
*Assistant Examiner*—Dalzid Singh
*Attorney, Agent, or Firm*—Harvey Fendelman; Peter A. Lipovsky; Eric James Whitesell

[57] ABSTRACT

An optical communications transceiver comprises a transmitter for transmitting a communications signal having at least two wavelengths and a receiver for concurrently detecting the communications signal on each wavelength. The receiver compares the data content of the communications signal received on each wavelength and detects errors in the received data. A display displays valid received data.

16 Claims, 10 Drawing Sheets

OVER-THE-HORIZON OPTICAL COMMUNICATIONS TRANSCEIVER

LICENSING INFORMATION

The invention described below is assigned to the United States Government and is available for licensing commercially. Technical and licensing inquiries may be directed to Harvey Fendelman, Legal Counsel For Patents, NCCOSC RDTE DIV CODE D0012, 53510 Silvergate Avenue Room 103, San Diego, Calif. 92152-5765; telephone no. (619)553-3818; fax no. (619)553-3821.

BACKGROUND OF THE INVENTION

The present invention relates to over-the-horizon communications systems. More specifically, but without limitation thereto, the present invention relates to transmitting and receiving over-the-horizon communications signals using atmospheric and other means to scatter optical radiation from a laser.

Reliable communications systems with high data rates are important for both military and commercial activities. The high bandwidth of optical devices and fiber optics has led to replacing traditional copper wire transmission links with fiber optic cables driven by optoelectronic devices. The optical fiber acts as a waveguide to confine modulated optical energy to a core region over large distances with limited attenuation.

Optical communications systems are also advantageous for secure communications because the signal escaping the fiber optic cable is difficult to detect and is also difficult to interfere or jam. However, fiber optic cables are not practical to use in many applications where one or more of the communications terminals is moving or located in an environment unsuited to fiber optic cables. Communications satellites may be used effectively for optical communications due to the low attenuation of light transmissions in free space. Terrestrial terminals may be located in a dry environment such as a desert or at elevations above cloud level to avoid scattering due to clouds and fog.

Free space communications generally requires line-of-sight, or a direct optical path from the transmitter to the receiver. Communications at sea level prohibit line-of-sight communications beyond distances of about ten miles, limiting the range of optical communications for ship-to-ship use.

Radio waves may be used for over-the-horizon and other environments that do not afford line-of-sight between communications terminals. A disadvantage of radio waves is the relatively low bandwidth available, even with UHF satellites. The competition for bandwidth makes it difficult to gain access to communications channels.

Another approach to non-line-of-sight communications is described in U.S. Pat. No. 4,493,114 by Geller, incorporated herein by reference thereto. Geller describes using an ultraviolet lamp as an omnidirectional transmitting source for short range communications. At longer ranges, however, ultraviolet wavelengths are severely attenuated by the atmosphere.

The pulse position modulation (PPM) described by Geller is widely used for high data rate optical communications. In this technique each character in the sender's alphabet is represented by a binary code. The terms "alphabet" and "character" are used to refer generally to all symbols that may be communicated in messages. These symbols include but are not restricted to alphabetical and numerical symbols.

The binary codes are transmitted as a series of optical pulses in consecutive time blocks each having a number of time slots N. Each time block represents a character determined by timing the optical pulse to coincide with a corresponding time slot q in the range of the N time slots.

For example, if N=256, which is equivalent to eight bits, then each time block would be divided into 256 time slots. A pulse having a duration of no more than the time block interval divided by 256 is timed to coincide with a time slot q within the time block. A single detected photon could theoretically communicate 256 bits of information using this technique. More typically, however, one or two bits are communicated by each photon. At one bit per photon, a 10 megabit data rate requires $10^7$ photons per second. For an optical beam having a wavelength of about 1.06 $\mu$m at a power level of one watt, approximately $5 \times 10^{18}$ photons per second may be generated. It is therefore possible to achieve high data rates with low power optical sources assuming that no stray photons of the same wavelength enter the detector. Unfortunately, preventing stray photons from reaching the detector is difficult, resulting in a bit error rate when more than one time slot in a time block contains a detected photon.

The PPM format for optical communications is appropriate in applications where the solar background may be eliminated or when the signal intensity is substantially higher than the background intensity. In line-of-sight optical communications systems, the field of view of the detector may be made narrow enough so that only the emission of the optical transmitter is received. For other than line-of-sight applications, the bit error rate of the PPM format becomes a problem. Each time more than one time slot in a time block of N time slots contains a detected photon, or if no photon is detected in any time slot, N bits of data are lost. Synchronization of the transmitter and the receiver also becomes more difficult in non-line-of-sight applications, where only a small fraction of the transmitted power reaches the detector. Typical causes of signal losses are low scattering probability in the atmosphere and divergence of the transmitted beam.

The intensity of scattered light relative to beam intensity may readily be demonstrated by observing a blue-green laser in a dark room. Low levels of scattered light from particulate and molecular scattering are readily visible to an observer located to the side of the beam propagation path. If a white card is placed in the beam path, the intensity of the beam may be visually compared to the atmospheric scattering. The difference is a dramatic illustration of how small a fraction of optical power is scattered normal to the propagation path. While low scattering environments propagate only a small fraction of the transmitted power, high scattering environments such as smoke and clouds severely attenuate the transmitted beam, reducing the effective range.

A continuing need therefore exists for an optical communications technique that is suitable for over-the-horizon communications and has a low bit-error rate.

SUMMARY OF THE INVENTION

The optical communications transceiver of the present invention is directed to overcoming the problems described above, and may provide further related advantages. No embodiment of the present invention described herein shall preclude other embodiments or advantages that may exist or become obvious to those skilled in the art.

An optical communications transceiver of the present invention comprises a transmitter for transmitting a communications signal having at least two wavelengths and a receiver for concurrently detecting the communications signal on each wavelength. The receiver compares the data content of the communications signal received on each wavelength and detects errors in the received data. A display displays valid received data.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

Figure 1:
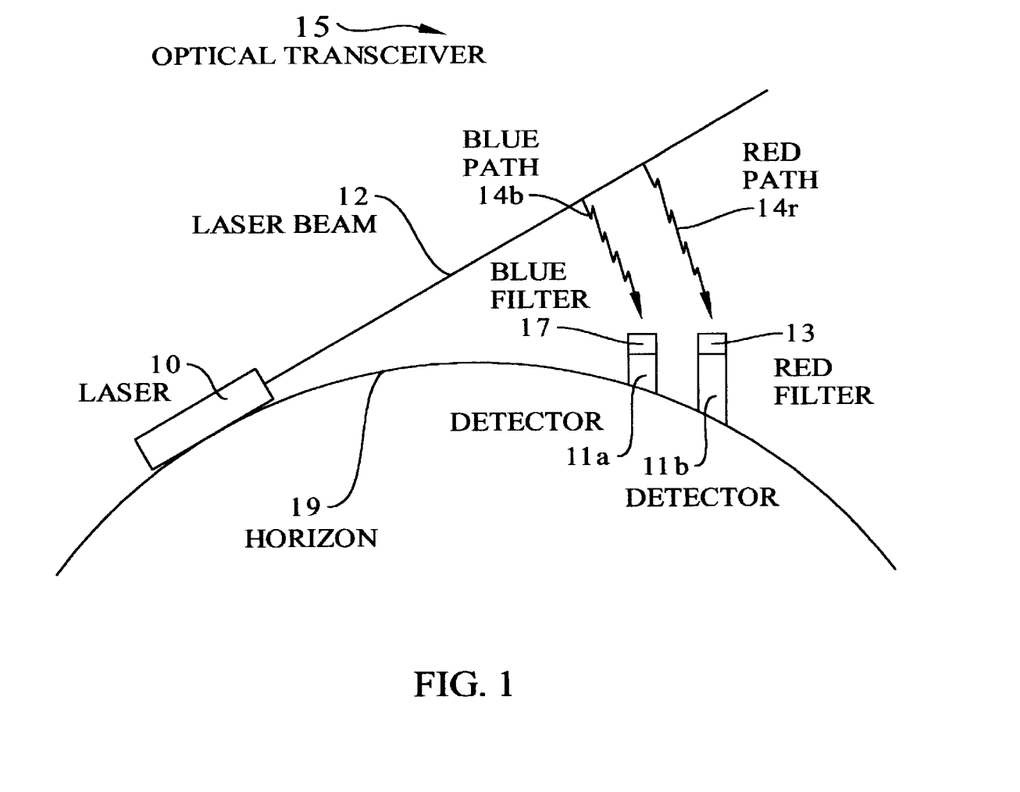
FIG. 1 illustrates typical propagation paths of an over-the-horizon optical transmission of the present invention.

In FIG. 1 a over-the-horizon (OTH) optical communications transceiver 15 comprises a laser transmitter 10 emitting a modulated laser beam 12 having two separate wavelengths. The longer of the two wavelengths is referred to herein as the "red" wavelength and the shorter of the two wavelengths is referred to as the "blue" wavelength. The terms "red" and "blue" are used solely to distinguish the two wavelengths and do not necessarily describe the appearance of the laser beams. Scattered light from laser beam 12 propagates over the horizon 19 along paths 14b and 14r to optical detectors 11a and 11b. Detector 11b detects only the red wavelength, while detector 11a detects only the blue wavelength. A color filter, interference filter, or other device well known in the art depicted as red filter 13 in detector 11b and as blue filter 17 in detector 11a may be used to limit the responses of detector 11a and detector 11b to the blue and red wavelengths respectively.

Figure 2A:
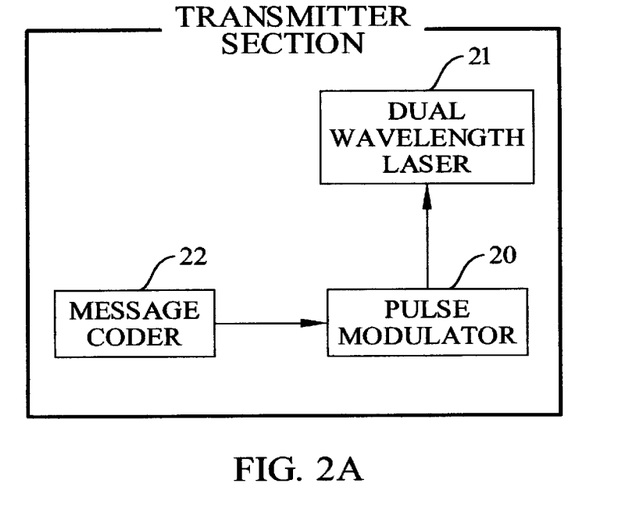
FIGS. 2A and 2B are functional diagrams of a first embodiment of the present invention.
Figure 2B:
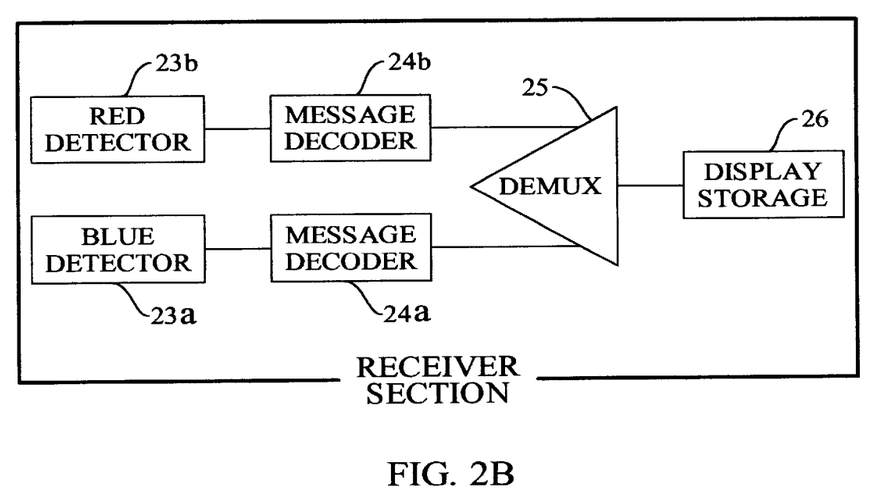

In FIGS. 2A and 2B, functional diagrams of a first embodiment of an OTH optical communications system comprise a transmitter section and a receiver section. The transmitter section comprises a PPM message coder 22, a pulse modulator 20, and a dual-wavelength laser 21. In this arrangement, message coder 22 encodes each message symbol as a time slot index within a time block. Pulse modulator 20 inputs the time slot index from message coder 22 and outputs the appropriate timing pulse within a time block to dual-wavelength laser 21. Dual wavelength laser 21 generates identical pulses at identical times for both the red and blue wavelengths.

In the receiver section, blue detector 23a and red detector 23b detect scattered radiation transmitted from dual-wavelength laser 21. Message decoders 24a and 24b decode the output of detectors 23a and 24b respectively. Demultiplexer 25 compares the outputs of message decoders 24a and 24b to determine whether a valid character has been received. If the outputs of both message decoders 24a and 24b indicate the same character, then the character is output to a display and storage device 26. If the same character is not indicated in the outputs of both message decoders 24a and 24b, then the time block is ignored by demultiplexer 25 and no character is output to display and storage device 26. Demultiplexer 25 and display and storage device 26 may be implemented, for example, in a small computer using well known programming techniques.

A variety of lasers may be used to implement dual-wavelength laser 21. A simple design using a nonlinear second harmonic generating crystal is exemplified by a Nd:YAG laser operating at 1.06 $\mu$m with a second harmonic generating crystal to produce a second output signal at a wavelength of 532 $\mu$m. A disadvantage of a second harmonic laser is that the wide separation in wavelengths may result in undesirable differences in propagation and scattering effects that could hinder concurrent detection of both signals. For propagation through the atmosphere, wavelengths shorter than 1.1 $\mu$m are preferable. A more suitable example of a dual-wavelength laser 21 for use with the embodiment of an OTH optical communications transceiver described above and shown in FIG. 2 is exemplified by the tunable laser 40 illustrated in FIG. 4.

Figure 4:
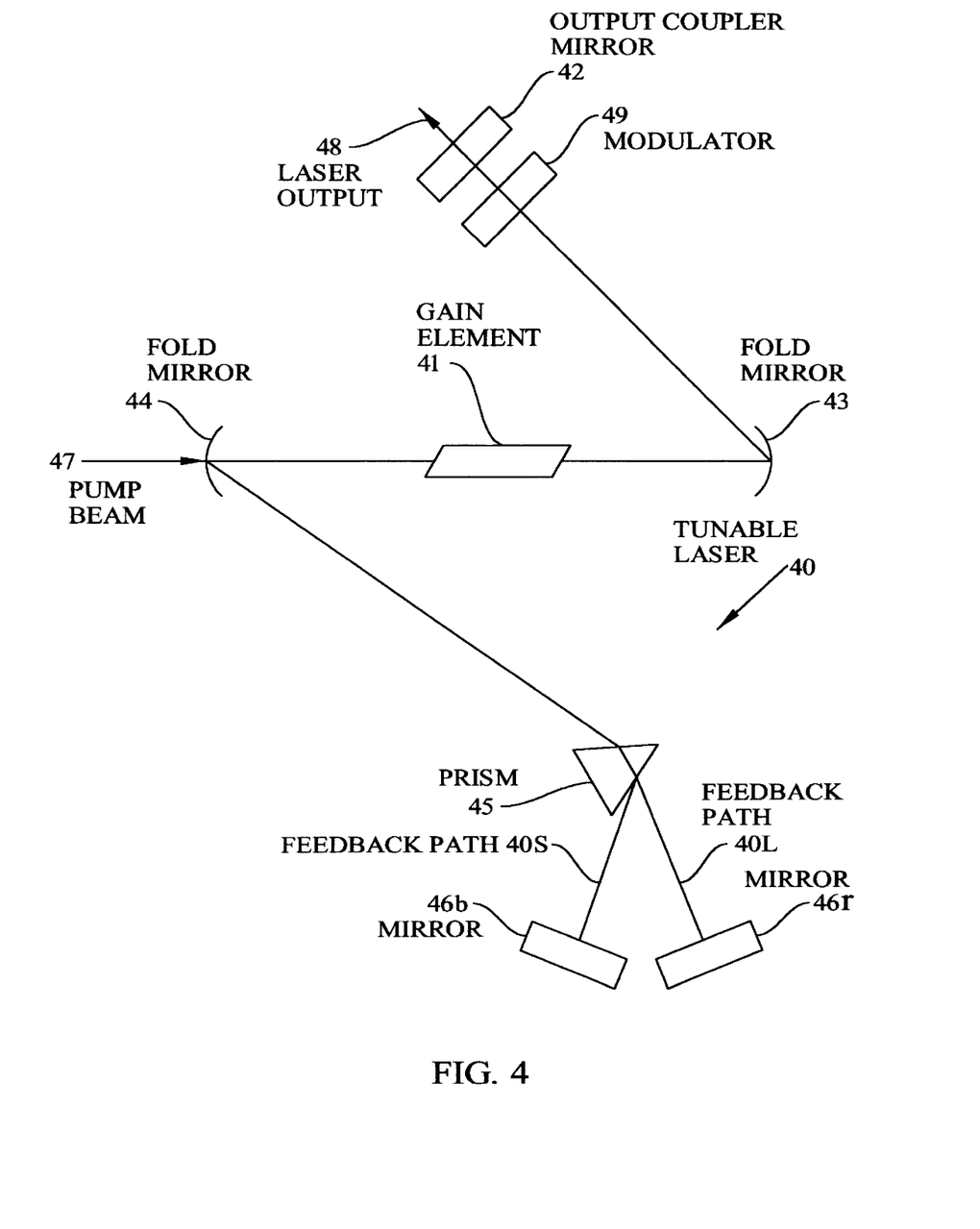
FIG. 4 is a diagram of a first dual-wavelength laser transmitter.

In FIG. 4 tunable laser 40 comprises a tunable laser gain element 41, an output coupler mirror 42, two fold mirrors 43 and 44, a Brewster angle prism 45, and two highly reflective mirrors 46b and 46r. Tunable laser gain element 41 may be, for example, a solid state laser gain element such as Ti:sapphire, Cr:LiSAF, or any other tunable solid state material. Alternatively, a liquid material may be used as a tunable gain element such as a dye laser gain element flowing in a jet stream or fixed in a solid state matrix. Tunable laser gain element 41 is optically pumped by pump beam 47 through fold mirror 44 that is transmissive at the pump beam wavelength.

Brewster prism 45 disperses the emission produced by tunable laser gain element 41 into separate feedback paths 40S and 40L respectively. Separate feedback paths 40S and 40L determined by the angle of Brewster prism 45 with respect to the axis of laser output 48 and the placement of highly reflective mirrors 46b and 46r provide feedback only at the wavelengths that are incident substantially perpendicular to highly reflective mirrors 46b and 46r.

Laser output 48 containing both blue and red wavelengths is emitted through output coupler mirror 42. The blue and red wavelengths may be changed while maintaining the same wavelength separation by altering the angular orientation of Brewster angle prism 45 with respect to highly reflective mirrors 46b and 46r. The red and blue wavelengths may be independently tuned by rotating mirrors 46b and 46r respectively.

Still referring to FIG. 4, pulse position modulation may be controlled by modulator 49. Modulator 49 may be, by way of example, an acousto-optic or electro-optic Q-switch or any other device to modulate the amplitude of laser output 48. Alternatively, laser output 48 may be modulated by modulating the amplitude of pump beam 47. Since the maximum modulation frequency is on the order of several times the inverse of the fluorescence lifetime, higher modulation rates may be achieved with this technique by using a tunable laser gain element 41 with a short fluorescence lifetime. For example, if tunable laser gain element 41 is a dye laser gain element and pump beam 47 is generated by laser diodes capable of modulation rates in excess of 1 GHz, correspondingly high modulation rates may be achieved in laser output 48. For materials such as Nd:YAG, the modulation rate resulting from the direct modulation of pump beam 47 is much slower than for a dye laser gain element, because the fluorescence lifetime of the Nd activator ion is approximately 230 $\mu$s while dye laser activator lifetime is typically about 5 ns.

Figure 3:
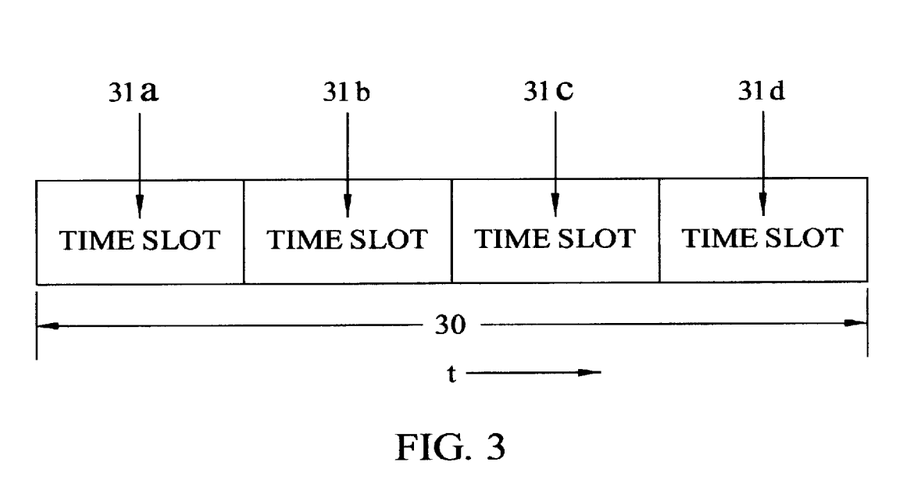
FIG. 3 is diagram of a timing block.

A disadvantage of the pulse position modulation format is that only one of the timing slots 31a, 31b, 31c, 31d in timing interval 30 exemplified in FIG. 3 may be used for each character, limiting the data rate. This disadvantage may be overcome by the embodiment illustrated in FIGS. 5A and 5B. Instead of transmitting identical characters on each of the red and blue wavelength channels as in FIG. 2, characters may be multiplexed or alternated between channels in the transmitter section by message coder multiplexer 52 and demultiplexed in the receiver section by demultiplexer 55. The modulated signal of the red wavelength is detected by red detector 53a while the modulated signal of the blue wavelength is detected by blue detector 53b. The error rate of this arrangement is the same as for single wavelength scattering detectors, but the data rate is doubled by the second wavelength detector. Except for message coder multiplexer 52 and demultiplexer 55, the structure and operation of the embodiment in FIG. 5 is similar to that of the embodiment illustrated in FIG. 2.

Figure 5A:
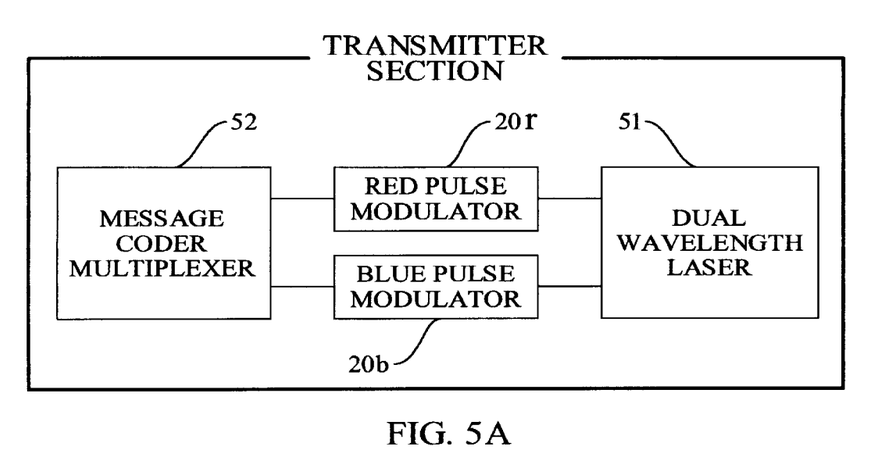
FIGS. 5A and 5B are functional diagrams of a second embodiment of the present invention.
Figure 5B:
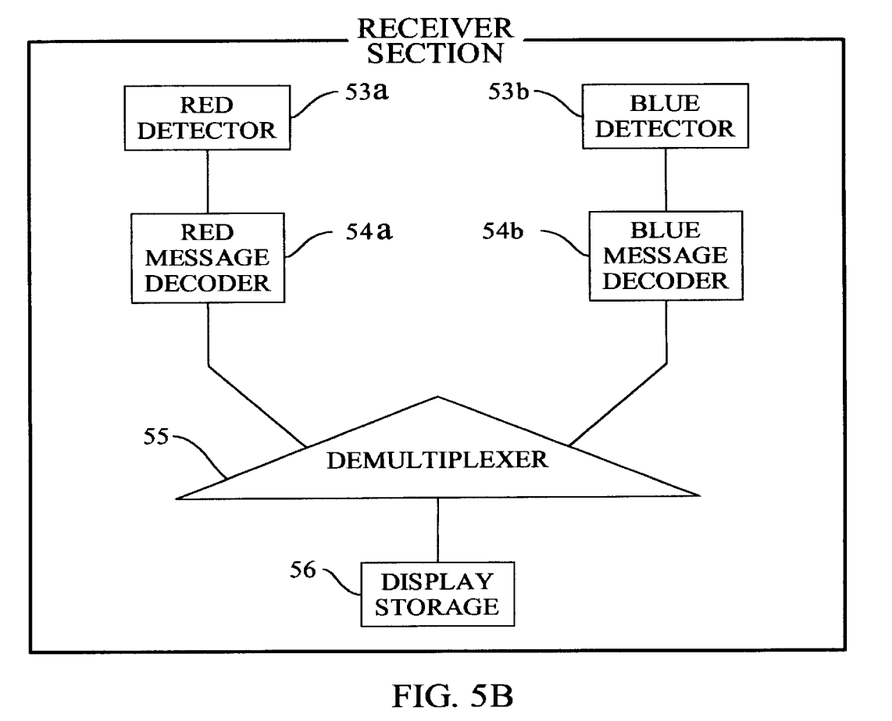
Figure 6A:
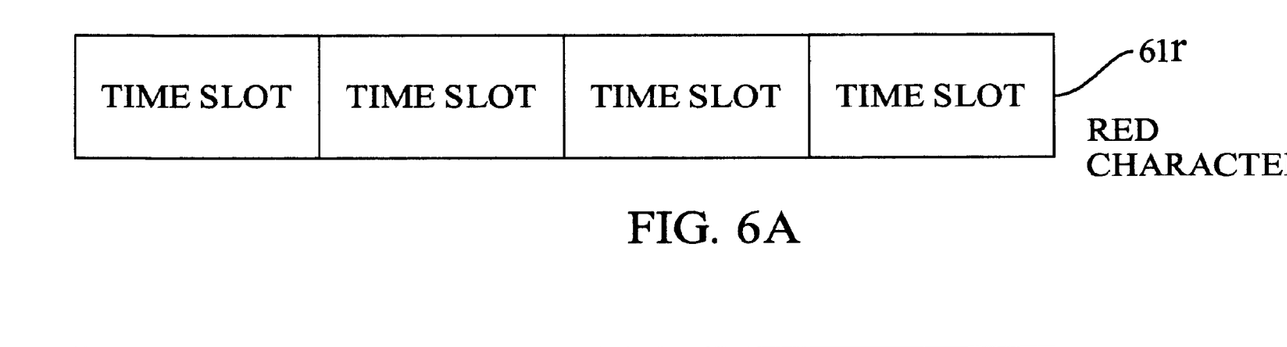
FIGS. 6A and 6B show timing blocks for two communications channels.
Figure 6B:
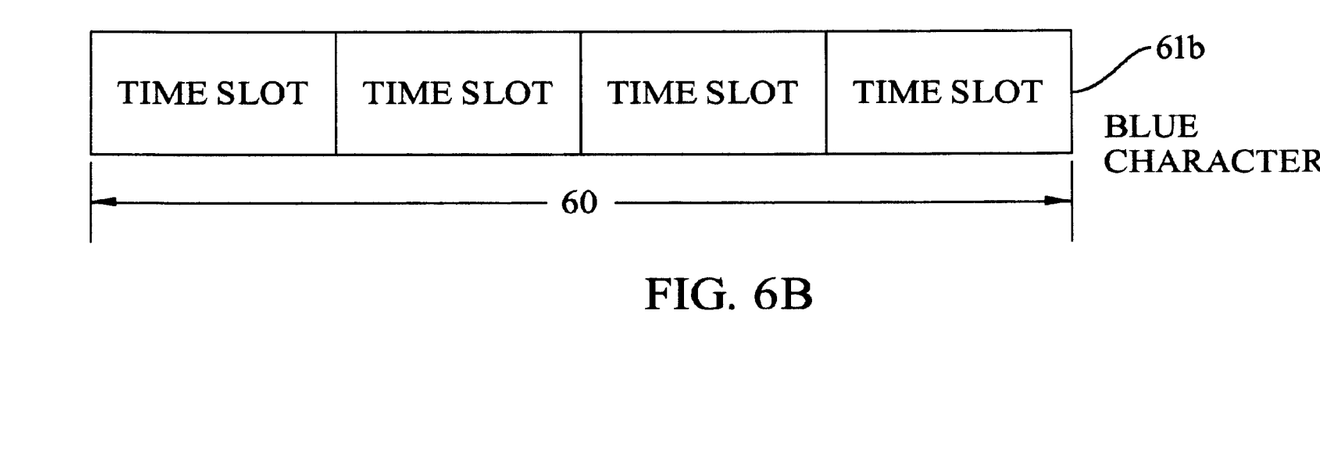

FIGS. 6A and 6B illustrate interlaced characters 61r and 61b generated by the transmitter section in FIG. 5A on the red and blue wavelength channels respectively and demultiplexed into separate characters by the receiver section. Each character has an exemplary four time slots, and is identified by the time slot in which the pulse from dual wavelength laser 51 is generated.

Figure 7:
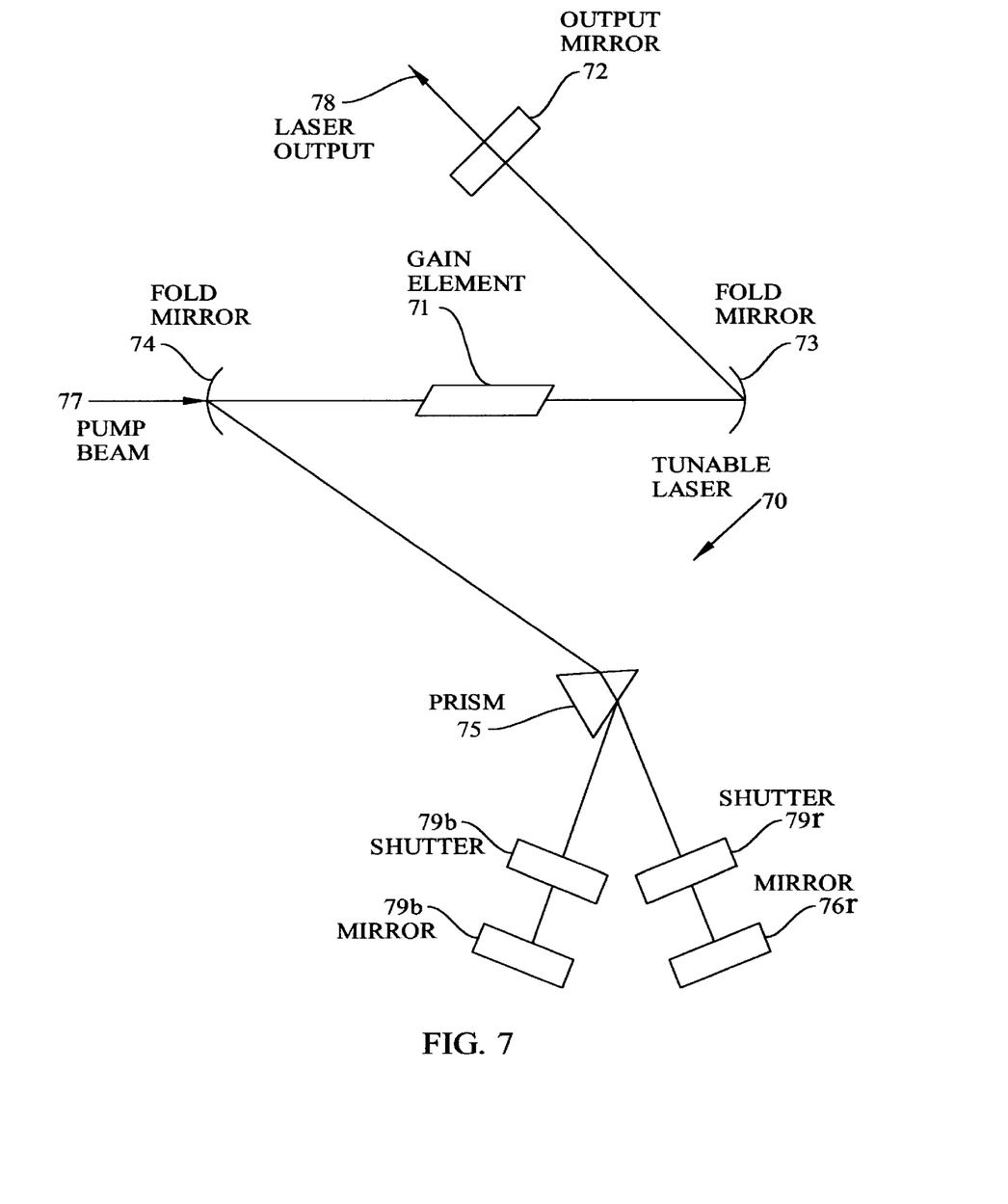
FIG. 7 is a diagram of a second dual-wavelength laser transmitter.

FIG. 7 illustrates an exemplary dual wavelength laser 70 that may be used in the embodiment of FIG. 5. Tunable laser 70 comprises laser gain element 71, output mirror 72, two concave fold mirrors 73 and 74 respectively, Brewster angle prism 75, intracavity shutters 79b and 79r, and highly reflective mirrors 76r and 76b respectively. Laser gain element 71 may be optically pumped by a pump beam 77 from a suitable pump source. Pump beam 77 may be CW, modulated, or pulsed. Highly reflective mirror 76b provides feedback for the blue wavelength while highly reflective mirror 76r provides feedback for the red wavelength.

Intracavity shutters 79b and 79r are located in the red and blue feedback paths respectively. When open, shutters 79b and 79r respectively cause the corresponding wavelength to be emitted in laser output 78. If both shutters 79b and 79r are closed, there is no feedback and no laser output 78. If only one shutter 79b or 79r is open, only the corresponding wavelength is emitted in laser output 78. Shutters 79b and 79r may be controlled by modulators 20b and 20r in FIG. 5A respectively to multiplex the characters from message coder multiplexer 52 in laser output 78. The multiplexed characters are generated as a pulse in the appropriate timing slot for each character.

Figure 8:
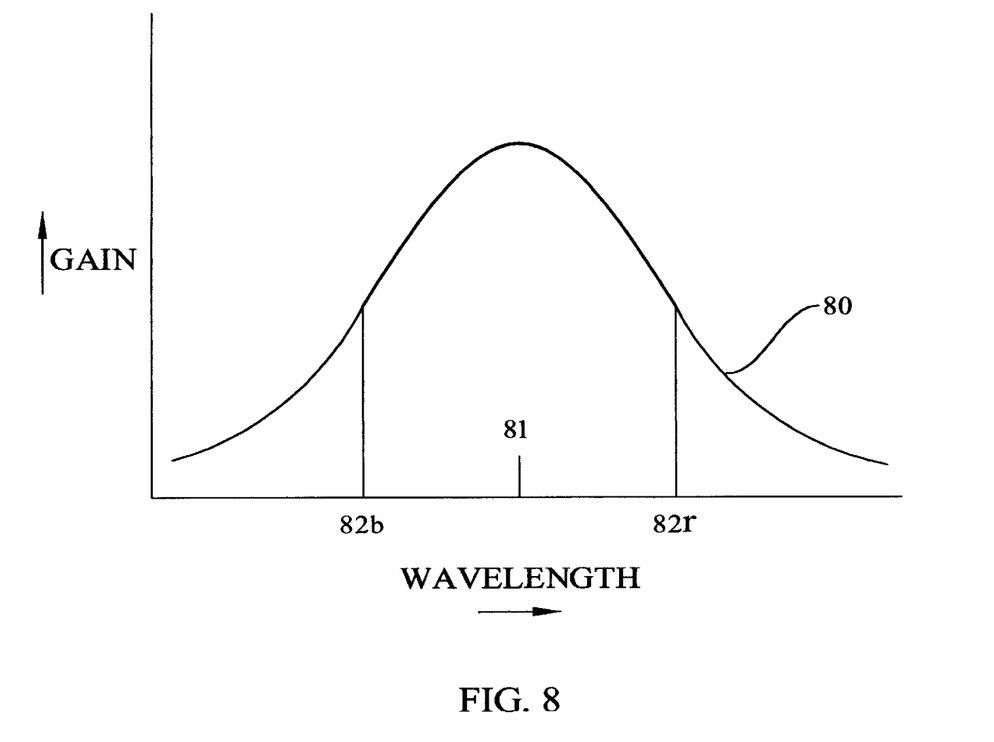
FIG. 8 is a typical gain curve for a tunable laser.

An important advantage of tunable laser 70 in FIG. 7 is that both the red and blue wavelengths are spatially overlapped in laser output 78, resulting in nearly identical paths to the respective red and blue detectors. The intensity of the output at each wavelength will be comparable if both wavelengths are selected to be symmetric with respect to the intrinsic gain curve of laser gain element 71. FIG. 8 illustrates a typical gain curve 80 for laser gain element 71 as a function of the emission wavelength. Wavelengths 82b and 82r are selected to have about equal gain on gain curve 80 with respect to the maximum gain output wavelength 81. Examples of laser gain elements suitable for laser gain element 71 are solid state Ti:sapphire, Cr:LiSAF, and solid matrix and flowing liquid dyes.

An advantage of tunable laser 40 in FIG. 4 and 70 in FIG. 7 is that each uses a single gain element requiring a single pump source. Additional highly reflective mirrors and shutters may be added in the embodiment illustrated in FIG. 7 to generate additional wavelengths to further increase the data rate by multiplexing or to reduce the error rate by techniques such as majority logic.

Figure 9A:
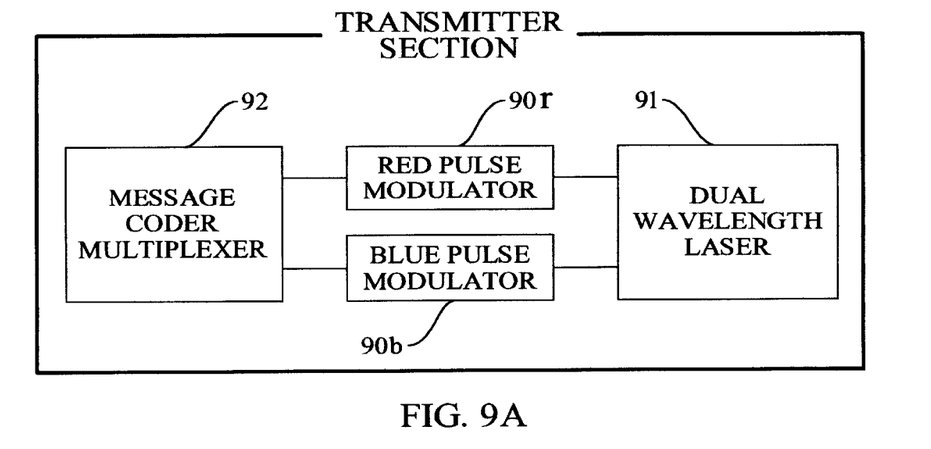
FIGS. 9A and 9B are functional diagrams of a third embodiment of the present invention.
Figure 9B:
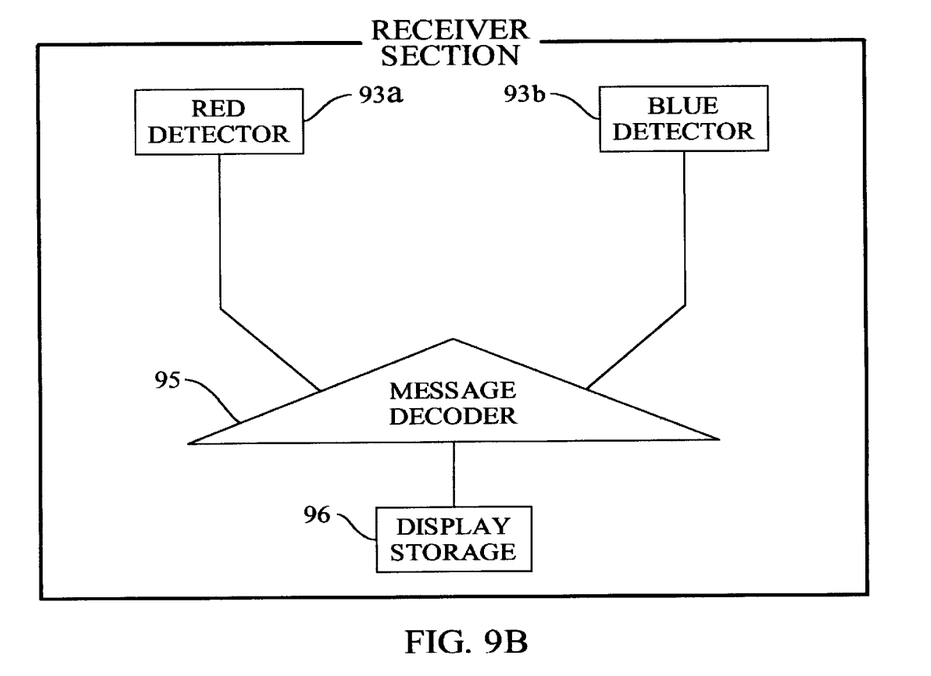

A third embodiment of an OTH optical communications system of the present invention is illustrated in FIGS. 9A and 9B. The components are similar to those in FIG. 5, but instead of using PPM coding, a mark-space format is used with one wavelength representing a mark and the other wavelength representing a space. The mark-space format does not have the timing restrictions of the PPM format, and increases the data rate by using more than one bit per sequence. For example, PPM codes may be transmitted as 0001, 0010, 0100, and 1000, while mark-space codes may be transmitted as 0001, 0010, 0011, 0100, 0101, 0110, 0111, 1000, etc. Additional wavelengths may be used to generate multiple-state code sequences to further increase the data rate. For example, a five bit code using three wavelengths could represent one of $3^5$ (243) characters.

Another advantage to the mark-space and multiple-state code formats is that the complementary mark-space or multiple-state code signals are emitted sequentially at their respective wavelengths, so that only one wavelength is used at a time. The population inversion in laser gain element 71 is therefore totally available to produce emission at each emitted wavelength.

Figure 10:
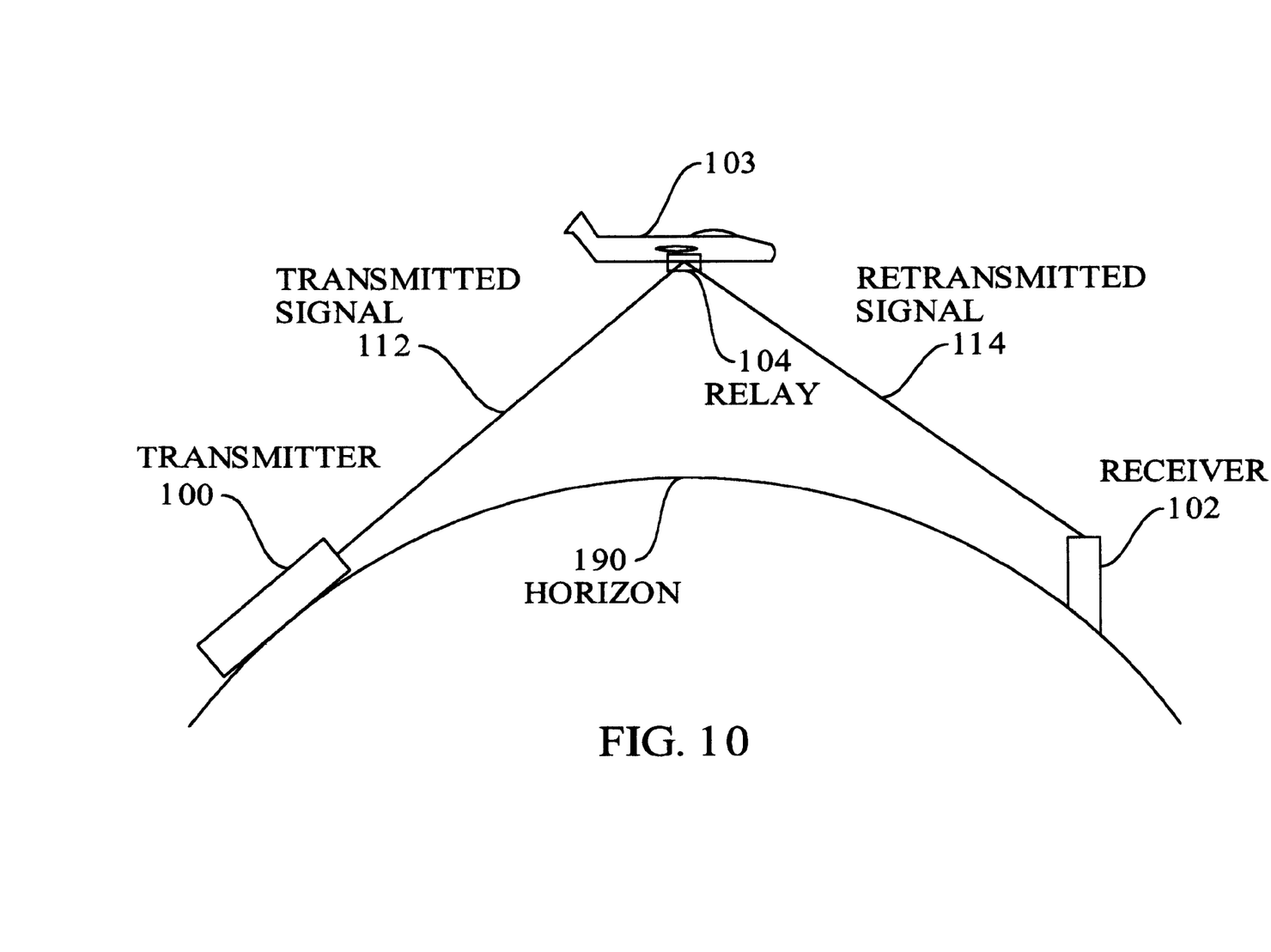
FIG. 10 illustrates an alternate propagation path of an over-the-horizon optical transmission of the present invention.

In FIG. 10 a line-of-sight path is established for OTH communications by an airborne vehicle 103, which may be, for example, an unmanned autonomous vehicle. Airborne vehicle 103 contains a relay 104 that receives signal 112 from transmitter 100 and retransmits it as signal 114 to receiver 102. Relay 104 may be, for example, a transceiver comprising the transmitter and receiver sections shown in FIGS. 5 and 9. Multiple airborne vehicles may be used to extend the communications range and to increase the signal-to-noise ratio of the communications signal, and multiple relays 104 may be used to provide full-duplex communications along the same path.

Other modifications, variations, and applications of the present invention may be made in accordance with the above teachings other than as specifically described to practice the invention within the scope of the following claims.

I claim:

1. A communications transceiver comprising:
   a transmitter section comprising:
      a message coder,
      a pulse modulator operably coupled to said message coder, and
      a radiating energy source operably coupled to said pulse modulator for transmitting substantially identical communications signals concurrently through a scattering medium to generate scattered communications signals on at least two wavelengths;
   and a receiver section comprising:

a detector for each said wavelength for receiving said scattered communications signals over a horizon concurrently, a message decoder operably coupled to each said detector respectively, a demultiplexer operably coupled to said message decoder, and a message interface operably coupled to said demultiplexer for outputting characters decoded from said scattered communications signals.

2. The communications transceiver of claim 1 wherein said communications signals have a pulse position modulation format.

3. The communications transceiver of claim 1 wherein said radiating energy source comprises:

a single tunable laser gain element for generating laser emissions on at least two wavelengths;

an output coupler mirror operably coupled to said laser gain element;

a first fold mirror operably coupled to said laser gain element and said output coupler mirror;

a second fold mirror operably coupled to said laser gain element and a pump beam;

a Brewster angle prism operably coupled to said second fold mirror; and a highly reflective mirror operably coupled to said Brewster angle prism for each said wavelength.

4. The communications transceiver of claim 3 wherein said gain element comprises one of Nd:YAG, Ti:sapphire, Cr:LiSAF, and a laser dye.

5. The communications transceiver of claim 1 wherein each said wavelength is shorter than 1.1 $\mu$m.

6. A communications transceiver comprising:

a transmitter section comprising
a message coder,
a pulse modulator operably coupled to said message coder, and
a radiating energy source operably coupled to said pulse modulator for transmitting substantially identical communications signals concurrently on at least two wavelengths; and a receiver section comprising:
a detector for each said wavelength for said communications signal concurrently,
a message decoder operably coupled to each said detector respectively,
a demultiplexer operably coupled to said message decoder, and
a message interface operably coupled to said demultiplexer for outputting characters decoded from said communications signal;
and a relay to extend communications range over a horizon.

7. The communications transceiver of claim 6 wherein said relay comprises an airborne vehicle.

8. A communications transceiver comprising:
a transmitter section comprising:
a message coder multiplexer,
at least two pulse modulators operably coupled to said message coder,
and a radiating energy source operably coupled to said pulse modulators for transmitting complementary communications signals on a separate wavelength through a scattering medium to generate scattered complementary communications signals for each said pulse modulator respectively;

and a receiver section comprising:
a detector for each said wavelength for receiving said scattered complementary communications signals over a horizon respectively,
a message decoder operably coupled to each said detector respectively,
a demultiplexer operably coupled to each said message decoder, and
a message interface operably coupled to said demultiplexer for outputting characters decoded from said communications signal.

9. The communications transceiver of claim 8 wherein said communications signal has a format that is one of pulse position modulation and digital pulse sequence.

10. The communications transceiver of claim 8 wherein said radiating energy source comprises:

a single tunable laser gain element for generating laser emissions on at least two wavelengths;

an output coupler mirror operably coupled to said laser gain element;

a first fold mirror operably coupled to said laser gain element and said output coupler mirror;

a second fold mirror operably coupled to said laser gain element and a pump beam;

a Brewster angle prism operably coupled to said second fold mirror;

an optical shutter for each said wavelength operably coupled to said pulse modulators and said Brewster angle prism; and a highly reflective mirror operably coupled to each said optical shutter respectively.

11. The communications transceiver of claim 10 wherein said gain element comprises one of Nd:YAG, Ti:sapphire, Cr:LiSAF, and a laser dye.

12. The communications transceiver of claim 8 wherein each said wavelength is shorter than 1.1 $\mu$m.

13. A communications transceiver comprising:
a transmitter section comprising:
a message coder multiplexer,
at least two pulse modulators operably coupled to said message coder, and
a radiating energy source operably coupled to said pulse modulators for transmitting complementary communications signals on a separate wavelength for each said pulse modulator respectively; and a receiver section comprising:
a detector for each said wavelength for receiving said each of said complementary communications signals respectively,
a message decoder operably coupled to each said detector respectively,
a demultiplexer operably coupled to each said message decoder, and
a message interface operably coupled to said demultiplexer for outputting characters decoded from said communications signal;
and a relay to extend communications range over a horizon.

14. The communications transceiver of claim 8 wherein said relay comprises an airborne vehicle.

15. A communications transceiver comprising:
a transmitter section comprising:
a message coder,
a pulse modulator operably coupled to said message coder, and a radiating energy source operably coupled to said pulse modulator for transmitting substantially identical communications signals concurrently though a scattering medium to generate scattered communications signals on at least two wavelengths; and a receiver section comprising:
   a detector for each said wavelength for receiving said scattered communications signals over a horizon concurrently,
   a message decoder operably coupled to each said detector respectively,
   a demultiplexer operably coupled to said message decoder, and
   a message interface operably coupled to said demultiplexer for outputting characters decoded from said communications signals,
   wherein said radiating energy source comprises:
      a single tunable laser gain element for generating laser emissions on at least two wavelengths;
      an output coupler mirror operably coupled to said laser gain element;
      a first fold mirror operably coupled to said laser gain element and said output coupler mirror;
      a second fold mirror operably coupled to said laser gain element and a pump beam;
      a Brewster angle prism operably coupled to said second fold mirror; and
      a highly reflective mirror operably coupled to said Brewster angle prism for each said wavelength;
      wherein said gain element comprises one of Nd:YAG, Ti:sapphire, Cr:LiSAF, and a laser dye.

16. A communications transceiver comprising:

a transmitter section comprising:
   a message coder multiplexer,
   at least two pulse modulators operably coupled to said message coder,
   and a radiating energy source operably coupled to said pulse modulators for transmitting complementary communications signals through a scattering medium to generate scattered complementary communications signals on a separate wavelength for each said pulse modulator respectively; and a receiver section comprising:
   a detector for each said wavelength for receiving said scattered complementary communications signals over a horizon respectively,
   a message decoder operably coupled to each said detector respectively,
   a demultiplexer operably coupled to each said message decoder,
   and a message interface operably coupled to said demultiplexer for outputting characters decoded from said communications signals, wherein said radiating energy source comprises:
      a single tunable laser gain element for generating laser emissions on at least two wavelengths;
      an output coupler mirror operably coupled to said laser gain element;
      a first fold mirror operably coupled to said laser gain element and said output coupler mirror;
      a second fold mirror operably coupled to said laser gain element and a pump beam;
      a Brewster angle prism operably coupled to said second fold mirror;
      an optical shutter for each said wavelength operably coupled to said pulse modulators and said Brewster angle prism; and
      a highly reflective mirror operably coupled to each said optical shutter respectively;
      wherein said gain element comprises one of Nd:YAG, Ti:sapphire, Cr:LiSAF, and a laser dye.

* * * * *